United States Patent [19]

Gerum

[11] 3,824,495

[45] July 16, 1974

[54] CRYSTAL OSCILLATOR, ESPECIALLY FOR CLOCKS AND WATCHES

[75] Inventor: Erich Gerum, Nurnberg, Germany

[73] Assignee: Diehl, Nurnberg, Germany

[22] Filed: Sept. 13, 1972

[21] Appl. No.: 288,680

[30] Foreign Application Priority Data

Sept. 17, 1971 Germany .......................... 2146490

[52] U.S. Cl. .............. 331/116 R, 331/159, 331/168

[51] Int. Cl. ............................................. H03b 5/36

[58] Field of Search ............ 331/116, 159, 117, 168

[56] References Cited

UNITED STATES PATENTS

| | | | |
|---|---|---|---|
| 3,137,826 | 6/1964 | Boudrias | 331/116 |
| 3,239,776 | 3/1966 | Shaw | 331/116 |
| 3,614,667 | 10/1971 | Fletcher | 331/116 |

FOREIGN PATENTS OR APPLICATIONS

| | | | |
|---|---|---|---|
| 648,437 | 9/1962 | Canada | 331/116 |

*Primary Examiner*—John Kominski
*Attorney, Agent, or Firm*—Walter Becker

[57] ABSTRACT

A crystal oscillator arrangement, especially for clocks and watches, in which an oscillator circuit has an input terminal connected to one side of a crystal while between the output side of the oscillator circuit and the other side of the crystal there is connected a decoupling stage that includes a nonlinear resistor. A pulse width varying component is connected in one of the oscillator circuit and decoupling stage. The arrangement provides for a phase shift from the input terminal of the oscillator circuit to the output side of the decoupling stage amounting to 360° or a whole multiple thereof. The arrangement provides for stabilization of the oscillator frequency over a wide range of variation of potential of the supply voltage source, usually, a battery.

14 Claims, 7 Drawing Figures

CRYSTAL OSCILLATOR, ESPECIALLY FOR CLOCKS AND WATCHES

The present invention relates to a crystal oscillator, especially for the drive of clocks and watches, with a circuit for stabilizing the frequency of the crystal when the supply voltage varies.

Crystal oscillator circuits for the drive of clocks and watches have been known for a considerable time. When employing such oscillator circuits in battery driven watches and clocks, the problem occurs that the voltage of the battery which decreases with the time of operation, also results in a decrease of the frequency of the crystal. This frequency reduction brings about a faulty running of the crystal which may result in said clock or watch differing by three minutes per year and more. This fault in the running considerably reduces the precision of the crystal.

It would be possible to supplement the heretofore known crystal oscillator circuits by a circuit for stabilizing the voltage in order to eliminate the above mentioned faulty running. Corresponding designs, however, have shown that approximately three transistors would be necessary for a voltage stabilizing circuit which is adapted to the specific requirements of crystal oscillators. Such expenses are, however, not always compatible with the economy or possible cost of crystal watches or crystal clocks.

It is, therefore, an object of the present invention to provide a crystal oscillator circuit which will be independent of variations in the voltage of the supply voltage source and which can be obtained at rather low cost.

These and other objects and advantages of the invention will appear more clearly from the following specification, in connection with the accompanying drawings, in which.

Figure 1:
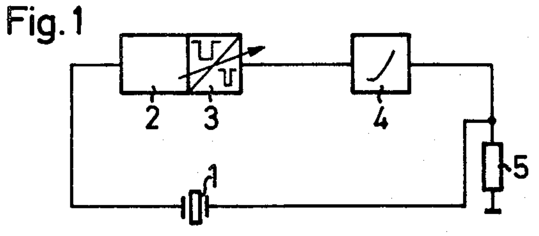
FIG. 1 represents a block diagram of the circuit according to the invention.

The crystal oscillator according to the present invention is characterized primarily in that at the exit of the oscillator circuit for the excitation of the crystal there are arranged a decoupling stage and a non-linear resistor, and furthermore characterized in that in series to said last mentioned resistor there is arranged an ohmic resistor while the triggering side of the crystal is connected to the common terminal of the two resistors. The crystal oscillator according to the invention is furthermore characterized by an arrangement for changing the band width of the triggering pulses, and that the overall arrangement is so designed that the phase shift between the exit and the inlet of the crystal amounts to 360° or a whole multiple thereof.

As decoupling stage, according to a further development of the invention there may be employed a transistor operated in a common collector circuit or a diode.

According to a preferred embodiment, the invention provides that as a non-linear resistor there are employed either the transistor or the diode of the decoupling stage. In this way, a particularly economic solution is realized.

When employing an oscillator circuit for the excitation of the crystal, which circuit comprising a two-stage galvanically coupled transistor amplifier in which the collectors of the transistors respectively are connected through a resistor with the first terminal and the emitters are connected to the second terminal of a supply voltage source, and in which the base of the inlet transistor is connected to the outlet terminal of the circuit, it is provided according to a further development of the invention, that the base of a transistor operated in a common collector circuit is connected to the outlet of the two-stage transistor amplifier. The collector of this transistor is connected to the first terminal and the emitter of this transistor is, through the ohmic resistor, connected to the second terminal of the supply voltage source and also to the inlet terminal of the crystal.

When employing a two-stage transistor amplifier in the above mentioned manner, a further advantageous development of the invention consists in that the arrangement for changing the band width of the trigger pulses for the crystal comprises a counter-coupling arrangement for the first stage of the two-stage transistor amplifier and also comprises a first adjustable resistor, one terminal of which is connected to the collector of the transistor whereas the second terminal is, through a second resistor, connected to the base of this transistor.

The above mentioned invention is based on the following consideration. With customary crystal oscillator circuits, a high load acts upon the crystal in view of the relatively high current in the circuit. With such circuits it will be found that at decreasing voltage of the supply voltage source, the frequency of the crystal drops and the above-mentioned running error occurs. Careful tests have proved that this dropping of the frequency is due to the following grounds. A dropping voltage means a dropping amplitude of the crystal and a frequency tendency which is dependent thereon, and points to lower values. At the same time, the current in the crystal oscillator will drop with decreasing voltage so that the load acting on the crystal likewise drops. This decreasing load, however, brings about that the frequency would increase if it were possible to disregard the change in frequency in view of the decreasing amplitude. Inasmuch as the effective change in frequency will at a certain decrease in the voltage have a considerably higher influence upon the frequency behavior of the circuit (in view of the dropping amplitude) than the influence of the load exerted upon the change in frequency, it has been found that as a result, the change in frequency in view of the dropping amplitude will prevail and thus a frequency will be obtained which drops in toto.

In view of tests, it has been found that for each crystal at a load specific for such crystal (which specific load is considerably lower than that of the customary circuits and amounts to a current flow of a few microamperes) the frequency becomes independent of the changing voltage and remains constant.

For the present invention, the following findings have become of considerable importance. Although, as will be evident from the above, two different influences are present for the change in frequency in response to a changing voltage, which two influences act counter to each other, it should be noted that in view of the low influences of the changes in the load, a mutual compensation of these influences is not possible. If, however, in conformity with the present invention, by employing a non-linear resistor, the load is reduced beyond the proportion when the voltage drops, the influence of load changes will be increased and as a result a compensation effect can be realized which results in a complete independence of the frequency from changes in the voltage in the customary range of from 1.7 volts to 1.1 volts of the battery voltage.

The above characterized solution according to the invention releases the said consideration by providing a decoupling stage which results in a high outlet resistance and thus in a low load acting upon the crystal. In view of the non-linear resistor, it is possible when the voltage changes, to realize an over-proportional change in the load which means in the flow of the current for the crystal. Due to the arrangement for varying the width of the control pulses for the crystal, a fine adjustment of the load for the crystal may be effected whereby the control circuit arrangement will be precisely adapted to the above mentioned specific load which for crystals of different cutting planes in different frequencies are necessary.

The measurement referred to below referred to oscillating crystals with a frequency of from 12 to 17 kHz.

Referring now to the drawings in detail, the arrangement shown therein comprises a quartz resonator or vibrator 1. Connected to the outlet of said quartz resonator is an oscillator circuit 2 having its outlet connected to an arrangement 3 for varying the band width of the control pulses for the quartz or crystal. At the outlet of said arrangement 3 there is provided a non-linear resistor 4, the outlet terminal of which, is connected both to the quartz oscillator 1 and to a high ohmic resistor 5 which is important for the load on the quartz or crystal 1.

Figure 2:
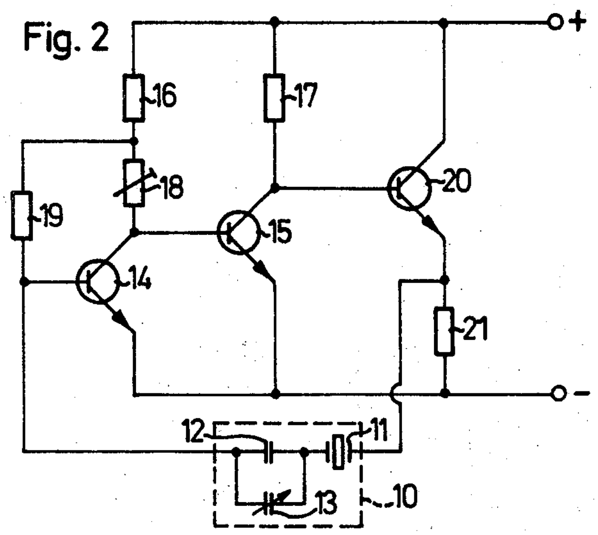
FIG. 2 shows a first embodiment of the invention while employing a transistor as decoupling stage.

According to the embodiment illustrated in FIG. 2, a crystal system 10 comprises a quartz resonator 11 and the customary series capacities 12 and 13 for setting the precise frequency of the quartz or crystal. Connected to the outlet terminal of the crystal system 10 is the base of a first transistor 14, the collector of which, is connected to the base of a second transistor 15. The two transistors 14 and 15 form a two-stage transistor amplifier and have their collectors connected to the plus pole of a battery of approximately 1.5 volts through the resistors 16 and 17. Provided in the collector circuit of the transistor 14 is an adjustable resistor 18 which, together with a resistor 19, forms a negative or inverse feedback for the transistor 14 and for the setting of the pulse width of the control pulses for the crystal. Connected to the outlet of the transistor 15 is a further transistor 20 which serves simultaneously as decoupling stage and as non-linear resistor. This resistor 20 has its collector likewise connected to the plus pole of the battery and has its emitter connected to the inlet terminal of the crystal system 10 as well as to a high ohmic resistor 21. This resistor has a resistance of approximately 680 KΩ. The adjustable resistor 18 is adjustable within a region of from 0 – 50 KΩ.

Figure 6:
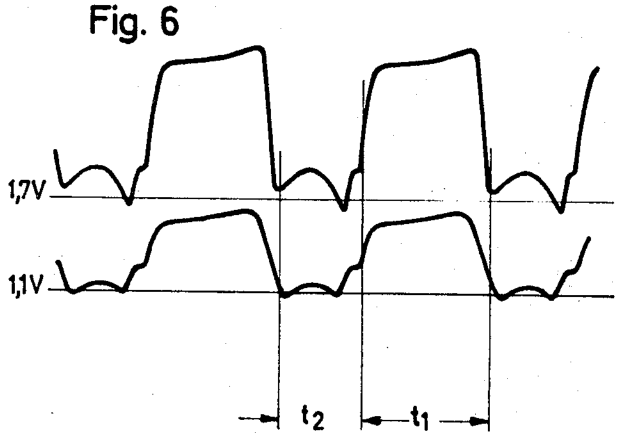
FIG. 6 is a diagram illustrating the control pulses for the crystal at a high and a low voltage under high load.

The oscillator circuit according to the present invention will now, in connection with FIGS. 2 and 6, be described as to its operation. The description starts with the assumption that the load on the crystal is too high and that consequently the effect obtainable by the invention is not yet obtained. To this end, the resistor 18 is adjusted to a value of 50 KΩ. Positive pulses at the outlet of the crystal system 10 control the transistor 14 and bring about that the transistor 15 is blocked. A positive potential will now prevail at the base of the transistor 20, and this transistor is driven hard, although not saturated. At the inlet terminal of the cyrstal system 10 there will now prevail a voltage the value of which is determined by the series arrangement of the resistor 21 and by the value of the forward resistance of the transistor 20. This value is approximately 170 KΩ. While the transistor 20 is conductive, energy is conveyed to the crystal as is indicated in FIG. 6 as phase *t*1.

When the crystal during its next semioscillation conveys negative pulses to the inlet of the transistor 14, the conditions are reversed and the transistor 20 is blocked. Now the resistor 21 with its 680 KΩ will act as load upon the crystal system. Inasmuch as the current in this phase, which in FIG. 6 is designated as *t*2 is considerably lower than in the preceding phase, the crystal is under a considerably lower load and is adapted to oscillate relatively free. The ratio of the time periods of *t*1 and *t*2 is an indication or measure for the load acting upon the crystal. This load, however, is with the embodiment of FIG. 6, not too high, and no constancy or stability of frequency will occur even though the frequency deviation is considerably less than with the heretofore known circuit arrangements.

Figure 7:
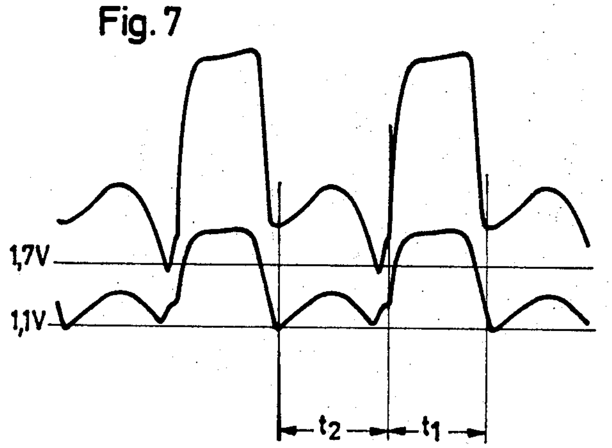
FIG. 7 represents a diagram which illustrates the control pulses at high and at a low voltage under a very low load.

If the resistor 18 is further reduced, the feedback will, through the resistor 19, increase, said resistor 19 having a resistance of approximately 120 KΩ, and the pulses occurring at the outlet of the transistor 14 getting narrower and narrower. In this way, the current flow can be reduced by the transistor 20 and, more specifically, until the load on the crystal has been reduced to the value specific for the respective crystal. These conditions occur with the circuit according to the invention at approximately the value of 18 KΩ for the resistor 18. If this resistor is still further reduced, the frequency dependency of the circuit arrangement will, in response to changes in the voltage, be reversed with regard to the previous condition, which means the frequency would increase with decreasing battery voltage. The conditions as they occur with the resistor 18 having 0 KΩ are illustrated in FIG. 7. As will be seen from FIG. 7, the phase t1 during which the crystal is under load, will be shorter, and the phase *t*2 during which the quartz or crystal is under no load will have become longer over what it was in the embodiment of FIG. 6. If, in this manner the corresponding load for the crystal has been set, changes in the battery voltage, for instance, during a decrease in the battery voltage, the current through the transistor 20 will decrease in view of the non-linear characteristic, and this decrease will be beyond proportion. As a result thereof, the frequency of the cyrstal has the tendency to increase. Simultaneously, however, in view of the amplitude decreasing as a result of the lower voltage, the frequency of the crystal will have the tendency to drop to lower values. In view of the correspondingly set base load upon the quartz, these two tendencies cancel each other out, and the crystal frequency remains constant in spite of changing voltage.

Figure 3:
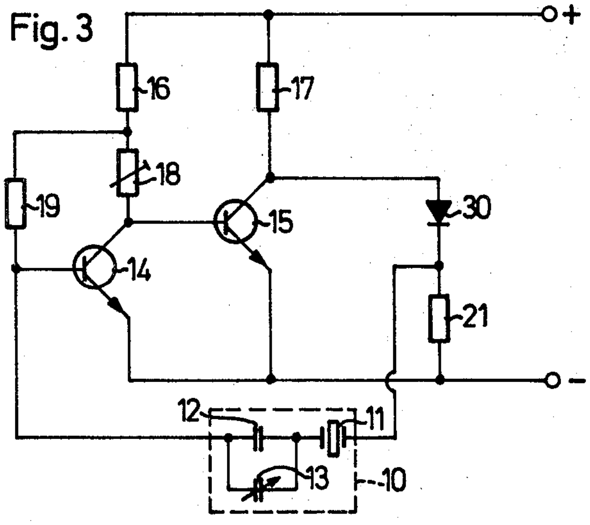
FIG. 3 represents a second embodiment of the invention while employing a diode as decoupling stage.

With the embodiment according to FIG. 3, the transistor 20 has been replaced by a diode 30. The remaining elements of the circuit have remained the same and are provided with the same reference numerals. The operation of this circuit is fundamentally the same as that of FIG. 2. Whenever the transistor 15 is blocked, a positive potential occurs at its collector and this potential connects through the diode 30 while conveying energy to the crystal system 10 through the resistor 17 (phase $t1$). When, however, the transistor 15 is conductive, a negative potential prevails at the anode of the diode 30, and the diode is blocked. In this instance, the crystal system 10 is connected only to the resistor 21 and consequently is hardly under a load (phase $t2$).

Figure 4:
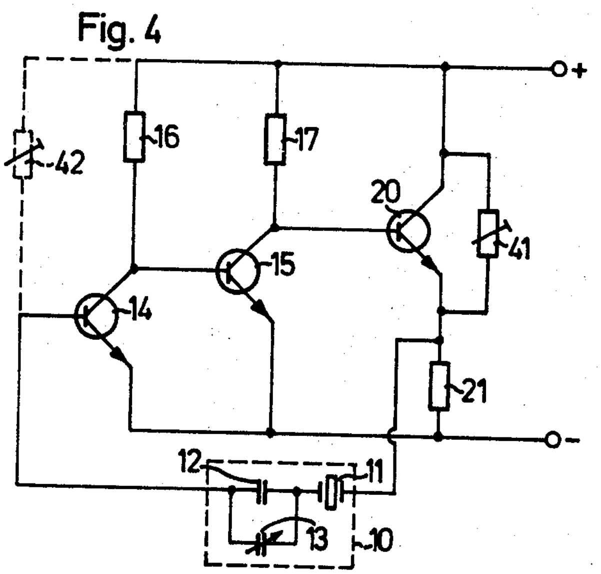
FIG. 4 is a modification of the first embodiment as shown in FIG. 2 with two alternative possibilities for changing the pulse band width.
Figure 5:
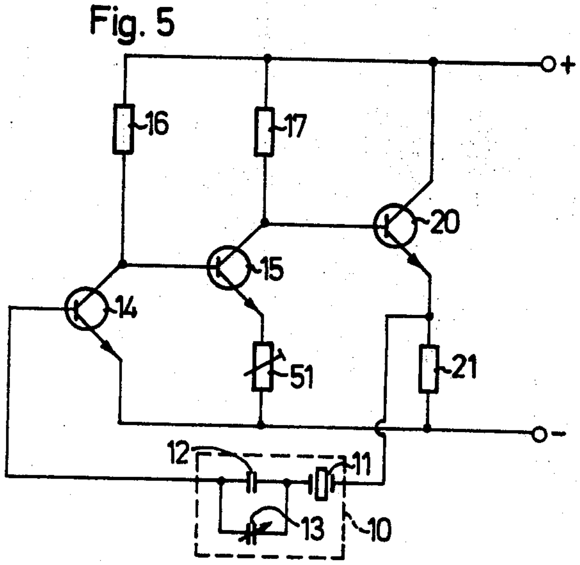
FIG. 5 is a further modification of the first embodiment with a second possibility of changing the pulse band width.

The circuit arrangements according to FIGS. 4 and 5 illustrate modifications over the first embodiment according to FIG. 2. In FIG. 4, a resistor 41 is employed for adjusting the pulse width, which resistor is arranged in parallel to the collector-emitter section of the transistor 20. Instead of the adjustable resistor 41, it is also possible for purposes of changing the pulse width, to employ a resistor 42 which is arranged between the base of the transistor 14 and the plus pole of the battery. Finally, FIG. 5 indicates the possibility of adjusting the pulse width by means of a variable resistor 51 in the emitter feed line of the transistor 15.

These modifications for the adjustment of the pulse width, according to FIGS. 4 and 5, can in an analogous manner also be used for the second embodiment of the invention, namely, the circuit arrangement according to FIG. 3.

It is, of course, to be understood that the present invention is, by no means, limited to the particular showing in the drawings, but also comprises any modifications within the scope of the appended claims.

What is claimed is:

1. In a crystal controlled oscillator circuit; positive and negative voltage source terminals, an oscillator circuit having an input terminal and an output terminal and connected across said source terminals, a crystal stage having a first terminal connected to the input terminal of said oscillator and also having a second terminal, a decoupling stage connected between the output of said oscillator circuit and said second terminal of said crystal stage, said decoupling stage including a nonlinear impedance of which resistance increases over-proportionally during dropping of voltage which means that current decreases over-proportionally and a fixed impedance in series between said source terminals, the juncture of said impedances being connected to said second terminal of said crystal stage, said decoupling stage having a control terminal connected to the output terminal of said oscillator circuit with width of controlling impulse given off therefrom being adjustable, the phase shift from the input terminal of said oscillator to the juncture of said impedances being 360° or a whole multiple thereof.

2. A circuit according to claim 1 in which said decoupling stage includes a transistor having emitter, collector, and base terminals, said base terminal forming said control terminal.

3. A circuit according to claim 1 in which said decoupling stage includes a diode having anode and cathode terminals, said anode terminal forming said control terminal.

4. A circuit according to claim 2 in which said transistor also serves as said nonlinear impedance.

5. A circuit according to claim 3 in which said diode also serves as said nonlinear impedance.

6. A circuit according to claim 1 in which said oscillator circuit comprises a two stage transistor amplifier, a resistor connecting the collector terminal of each transistor with one of said source terminals, the emitters of said transistors being connected to the other source terminal, the base of one transistor forming the said input terminal, the collector of said one transistor being connected to the base of the other of said transistors and the collector of said other transistor forming said output terminal.

7. A circuit according to claim 6 in which said decoupling stage comprises a third transistor having the collector connected to said one source terminal and the base connected to said output terminal, the emitter of said third transistor being connected to said second terminal of said crystal stage and through said fixed impedance to said other source terminal.

8. A circuit according to claim 6 in which said decoupling stage comprises a diode having the anode connected to said output terminal and the cathode side connected to said second terminal of said crystal stage and through said fixed impedance to said other source terminal.

9. A circuit according to claim 1 in which said oscillator circuit includes inverse feed back means for varying the pulse width developed thereby.

10. A circuit according to claim 6 in which said oscillator circuit includes pulse width varying negative feed back means in the form of an adjustable resistor interposed between the collector of said one transistor and the resistor connecting the collector to said one source terminal and a fixed resistor connecting the end of said adjustable resistor opposite said collector to the base of said one transistor.

11. A circuit according to claim 6 which includes an adjustable resistor between the emitter of said other transistor and said other source terminal.

12. A circuit according to claim 7 which includes a pulse width varying adjustable resistor in parallel with the collector-emitter path of said third transistor.

13. A circuit according to claim 8 which includes a pulse width varying adjustable resistor in parallel with said diode.

14. A circuit according to claim 1 which includes an adjustable impedance connected in parallel with said non-linear impedance.

* * * * *